(12) United States Patent
Notsuyu et al.

(10) Patent No.: US 7,006,754 B2
(45) Date of Patent: Feb. 28, 2006

(54) PICTURE IMAGE OUTPUTTING APPARATUS

(75) Inventors: Toshiaki Notsuyu, Kanagawa (JP); Shinichi Wakai, Kanagawa (JP); Nozomi Yamamoto, Tokyo (JP); Osamu Yoshitake, Chiba (JP); Kunihiko Shindo, Chiba (JP)

(73) Assignee: SONY Corporation, (JP)

( * ) Notice: Subject to any disclaimer, the term of this patent is extended or adjusted under 35 U.S.C. 154(b) by 1128 days.

(21) Appl. No.: 09/863,445

(22) Filed: May 24, 2001

(65) Prior Publication Data
US 2001/0053273 A1    Dec. 20, 2001

(30) Foreign Application Priority Data
Jun. 8, 2000    (JP) ............................ P2000-171815

(51) Int. Cl.
*H04N 5/91*    (2006.01)
(52) U.S. Cl. ............................ 386/46; 386/83; 386/94
(58) Field of Classification Search .................. 386/46, 386/94, 95, 83; 725/27
See application file for complete search history.

(56) References Cited

U.S. PATENT DOCUMENTS

| | | | |
|---|---|---|---|
| 5,329,320 A * | 7/1994 | Yifrach ........................ | 348/738 |
| 5,548,345 A * | 8/1996 | Brian et al. ................... | 725/27 |
| 6,738,561 B1 * | 5/2004 | Tanaka et al. ................. | 386/96 |
| 6,754,436 B1 * | 6/2004 | Shinagawa et al. ........... | 386/83 |

* cited by examiner

*Primary Examiner*—Huy Nguyen
(74) *Attorney, Agent, or Firm*—Rader, Fishman, & Grauer PLLC; Ronald P. Kananen

(57) ABSTRACT

There is provided a playing time limiting mode for controlling a picture image outputting apparatus by means of a playing time enabling the outputting operation of a picture image and a locking time disabling the outputting operation of a picture image, in which the playing time is set to be a preferable value by the setting operation of a user; a value set beforehand in the apparatus is used as the locking time; when a playing time limiting mode is selected by a mode selection, first, the timing of the playing time is begun according to a prescribed condition, and when the passing of the playing time is detected, the timing of the locking time is begun and the operation of the outputting of a picture image is made to be impossible until the locking time has passed.

20 Claims, 4 Drawing Sheets

PICTURE IMAGE OUTPUTTING APPARATUS

BACKGROUND OF THE INVENTION

1. Field of the Invention

The present invention relates to a picture image outputting apparatus for outputting a picture image for display, and more particularly, to a picture image outputting apparatus effective in the application to, for example, a video cassette recorder, a digital versatile disk (DVD) player, a game machine and other equipment.

2. Description of the Related Art

In recent years, various picture image apparatus such as the video cassette recorder and the game machine have rapidly become popular, and they are inclined to be used more personally in comparison with the conventional usage of them.

Consequently, there are many cases where an apparatus is given to a child for its use only. In such a case, the using time of the apparatus is determined by the will of the child.

However, children have a tendency to be enthusiastic about video pictures such as animations and games. As a result, a problem such that the children's health is injured because they continued to use the apparatus for a long time has been produced, and besides, it is not preferable to use the apparatus for a long time from the aspect of education.

SUMMARY OF THE INVENTION

Accordingly, an object of the present invention is to provide a picture image outputting apparatus capable of preventing the long time usage of the picture image outputting apparatus because of excessive enthusiasm when a child uses the picture image outputting apparatus alone, and capable of ensuring the sound usage form of the picture image outputting apparatus.

According to the present invention, the foregoing and other objects and advantages are attained by a picture image outputting apparatus comprising: storage means for storing a playing time for enabling an output operation of a picture image and a locking time for disabling the output operation of a picture image; playing time timing means for timing the playing time; locking time timing means for timing the locking time; mode selecting means for selecting a playing time limiting mode for controlling the picture image outputting apparatus on the basis of the playing time and the locking time; and control means for starting the timing of the playing time timing means after the playing time limiting mode has been selected and for starting the timing of the locking time timing means when the passage of the playing time is detected to disable the output operation of the picture image until the locking time has passed.

In a picture image outputting apparatus of the present invention, the playing time for enabling the output operation of a picture image and the locking time for disabling the output operation of a picture image are previously memorized in the storage means by a setting operation of a user or by initial setting.

Then, when the playing time limiting mode for controlling the picture image outputting apparatus on the basis of the playing time and the locking time is selected with the mode selecting means, the control means starts the timing of the playing time timing means in conformity with a prescribed condition, and starts the timing of the locking time timing means when the passage of the playing time is detected to disable the output operation of the picture image until the locking time has passed.

Consequently, in the playing time limiting mode, a continuous picture image outputting operation for at least not shorter than the playing time becomes impossible to perform, and the restart of the picture image outputting operation is locked until the locking time has passed, and consequently, the long time usage of the picture image outputting apparatus, for example, in the case where a child solely uses it, is prevented, and thereby the sound usage form of the picture image apparatus can be ensured.

As described above, the picture image outputting apparatus of the present invention is provided with the playing time limiting mode including the playing time for enabling the output operation of a picture image and the locking time for disabling the output operation of a picture image, and starts the timing of the playing time at first when the playing time limiting mode is selected, and then starts the timing of the locking time when the passage of the playing time is detected to disable the output operation of the picture image until the locking time has passed.

Consequently, in the playing time limiting mode, a continuous picture image outputting operation for at least not shorter than the playing time becomes impossible to perform, and the restart of the picture image outputting operation is locked until the locking time has passed, and consequently, the long time usage of the picture image outputting apparatus, for example, in a case where a child solely uses it, is prevented, and thereby the present invention has an advantage that the sound usage form of the picture image apparatus can be ensured.

BRIEF DESCRIPTION OF THE DRAWINGS

The above and other objects, features and advantages of the present invention will become more apparent from the following description of the presently preferred exemplary embodiments of the invention taken in conjunction with the accompanying drawings, in which.

DESCRIPTION OF THE PREFERRED EMBODIMENTS

Hereinafter, an embodiment of the picture image outputting apparatus according to the present invention will be described.

The present embodiment is a case where the present invention is applied to a video deck to reproduce a video signal from a video cassette tape to output the reproduced video signal to a television (TV) monitor.

Figure 1:
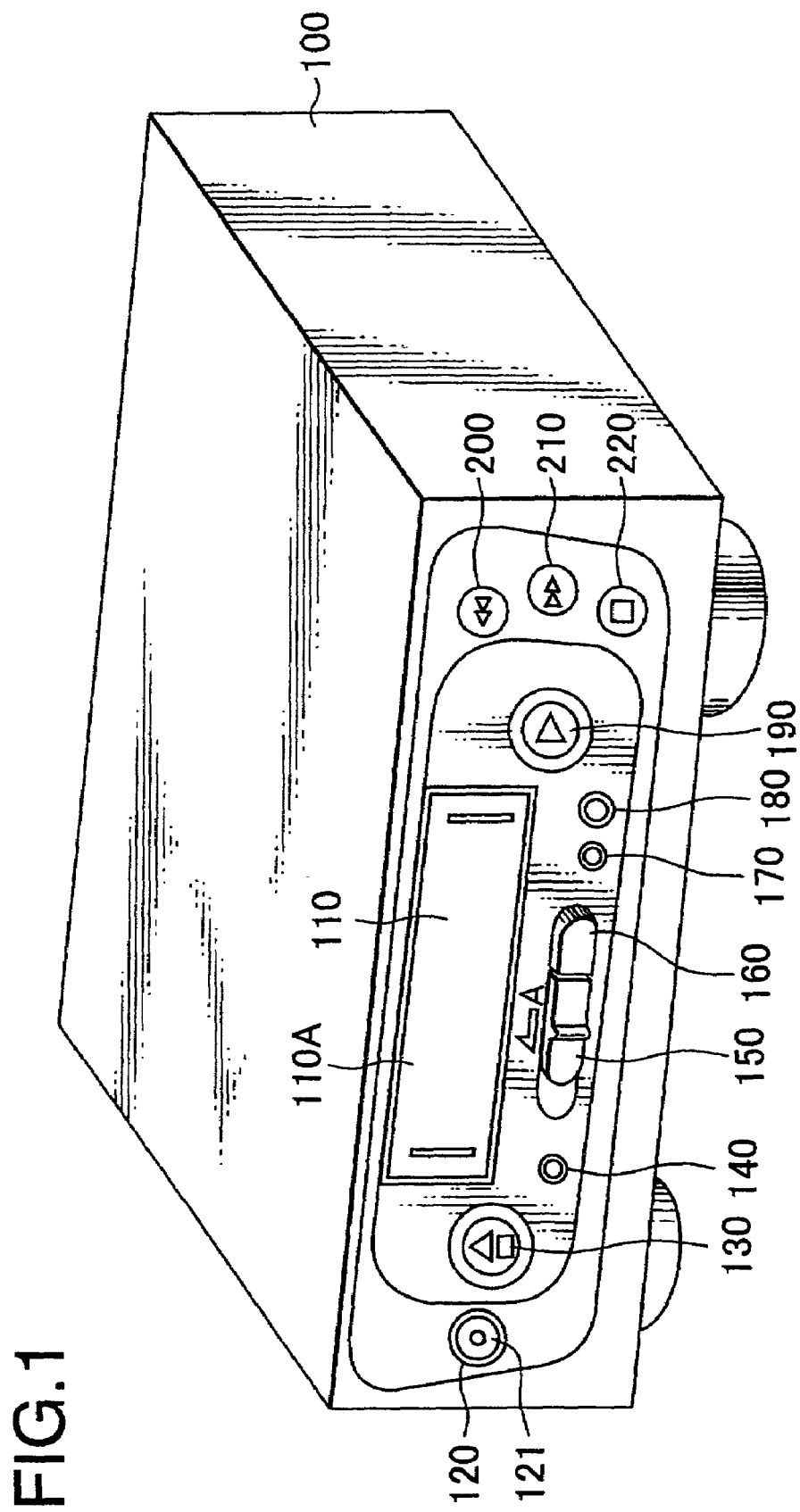
FIG. 1 is a perspective view showing an exterior of a video deck according to an embodiment of the present invention.
Figure 2:
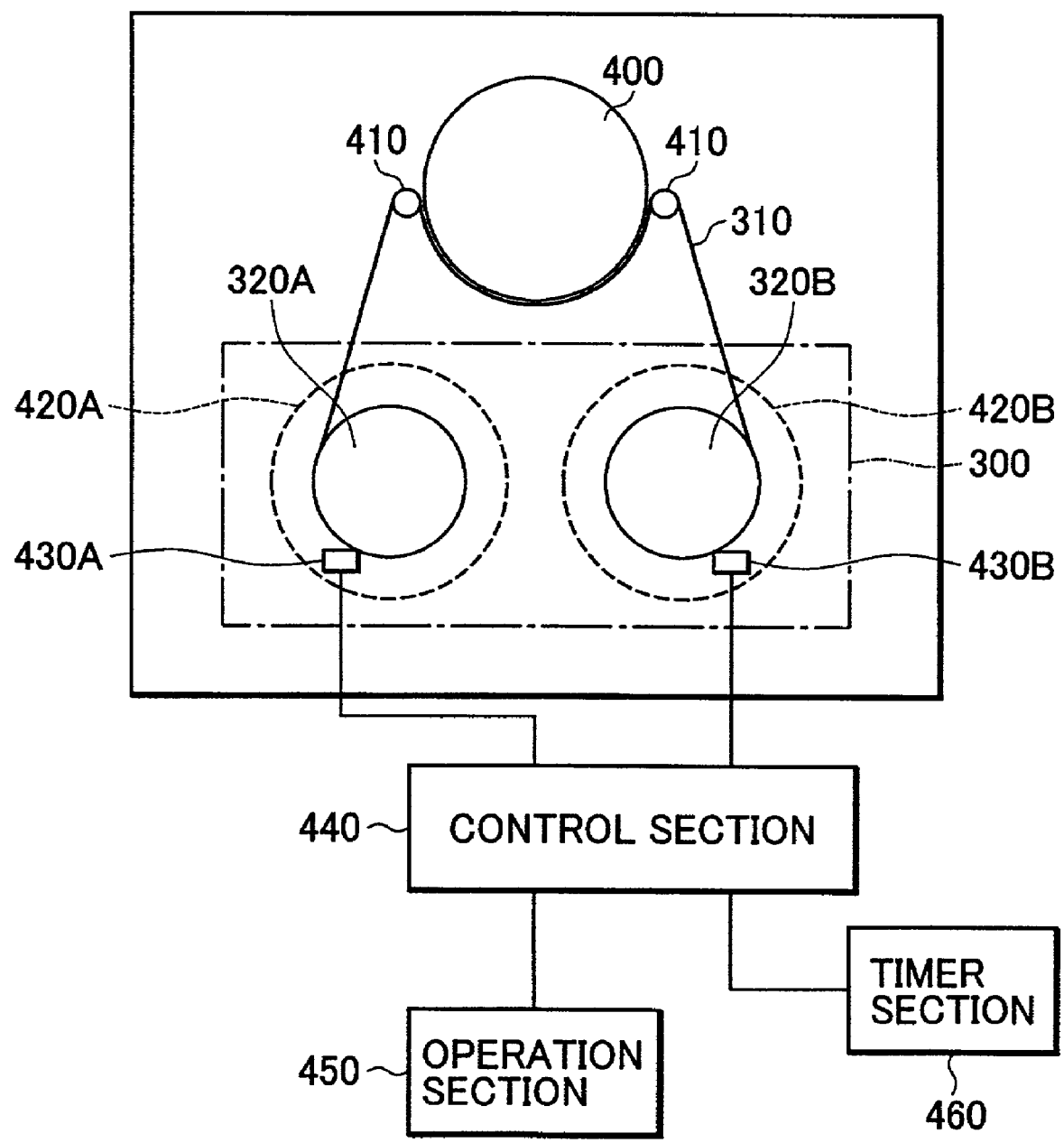
FIG. 2 is a plan view showing a tape running system and a control system of the video deck shown in FIG. 1.

FIG. 1 is a perspective view showing the exterior of the video deck according to the embodiment of the present invention, and FIG. 2 is a plan view showing the tape running system and the control system of the video deck of the embodiment.

As shown in FIG. 1, the video deck of the present embodiment includes an insertion aperture 110 of a video cassette (not shown in FIG. 1), various operation keys, indicating lamps and other parts, all of which are arranged on a front surface of a housing 100.

The cassette insertion aperture 110 is equipped with an opening and shutting lid 110A, and when the opening and shutting lid 110A is brought down to the inside, the inside cassette mounting mechanism (not shown) starts, and the video cassette is set at a prescribed loading position in the housing 100.

Moreover, a power supply button 120 is for operating the power source of the video deck to turn on and off. Moreover, a power indication lamp 121 provided in the power supply button 120 is a lamp indicating that power is supplied to the video deck, and the power indication lamp 121 is put out when the power is tuned off and the power indication lamp 121 is lighted when the power is turned on.

Moreover, a cassette taking out key 130 is for instructing the taking out of the video cassette. When the cassette taking out key 130 is pushed down, the cassette mounting mechanism starts to operate for ejecting the video cassette from the inside of the housing 100 to the cassette insertion aperture 110.

Moreover, a setup key 140 is a specific key for a user to set a playing time when the user selects a playing time limiting mode using the playing time and a locking time that is a characteristic feature of the present invention. In the present embodiment, the playing time limiting mode is selected by the completion of the setting operation of the playing time with the setup key 140, and the embodiment enters into the operation of the playing time limiting mode including the playing time and the locking time after that.

Moreover, in the present embodiment, the playing time limiting mode can compulsorily be released by the operation of the setup key 140.

Incidentally, the details of the method of the use of the setup key 140 will be described later.

Moreover, a slide key 150 and a push key 160 are used as a pair to lock the video deck in a state of the prohibition of being used.

That is, when the slide key 150 is slid in the direction of an arrow "A" while the push key 160 is pushed down, the slide key 150 is held in a state that it has been slid in the direction of the arrow "A". In this state, the opening and shutting lid 110A of the cassette insertion aperture 110 is locked in a state of being impossible to be opened or shut, and besides the cassette taking out key 130 is also locked in the state of being operated. Thus, the video deck can be set to be a state impossible to be used.

Moreover, when the slide key 150 is slid in the direction opposite to the direction of the arrow "A" while the push key 160 is pushed down and then the pushing down of the push key 160 is released, the slide key 150 is held in a state that it is returned to the original position. In the state, the lock is released, and the opening and shutting lid 110 A of the cassette insertion aperture 110 becomes possible to be opened and shut, and the cassette taking out key 130 becomes also possible to be operated.

Moreover, a recording mode selection key 170 is a key for the selection of the recording mode of a video tape from an ordinary mode and a long time mode, and a record key 180 is a key for instructing the recording operation to the video tape.

Moreover, a play key 190 is a key for instructing the reproduce operation of the video tape, and a rewind key 200 is a key for instructing the rewinding of the video tape.

Moreover, a fast-forward key 210 is a key for instructing the fast-forwarding of the video tape, and a stop key 220 is a key for instructing the stoppage of the recording, the reproducing, the rewinding and the fast-forwarding of the video tape.

Next, in FIG. 2, a video cassette 300 is set at a loading position in the housing 100 by the cassette mounting mechanism. A video tape 310 of the video cassette 300 is pulled out by a loading mechanism including a roller 410 to be disposed in a state that the video tape 310 contacts on an outer peripheral surface of a rotation drum 400 loading a magnetic head in a slidable state.

Moreover, each reel section 320A and 320B of the video cassette 300 are engaged with reel stands 420A and 420B formed in the video deck to be rotated and driven by a reel driving mechanism (not shown).

The rotational speeds of the reel sections 320A and 320B by the reel driving mechanism are detected by sensor sections 430A and 430B. In the sensor sections 430A and 430B, for example, encoder plates having reflecting sections and non-reflecting sections disposed alternately in the directions of the rotations of their rotation shafts are disposed on the side of the reel stands 420A and 420B (rotation side), and reflection type photo sensors (or the sensor sections 430A and 430B) are disposed on the side of the chassis of the video deck (fixed side) opposed to the encoder plates, and thereby the reflection type photo sensors detect the rotational speeds of the reel sections 320A and 320B by detecting the switching speeds of the reflecting sections and the non-reflecting sections of the encoder plates.

The tape remaining quantity of each reel section 320A, 320B is managed by the detection of the rotational speeds of the reel sections 320A and 320B, and thereby the control of the acceleration and the deceleration of the tape is performed at the time of the fast-forwarding and the rewinding of the tape. Incidentally, the structure of the sensor sections is not limited to the aforesaid example, and the structure may be, for example, a combination of a magnetic material and a hall element or other combinations.

Moreover, the detection of the rotational speeds of such reel sections 320A and 320B is used for the calculation of the remaining playing time of a video tape being played in a second example of operation, shown in FIG. 4, of the playing time limiting mode including the playing time and the locking time that is a characteristic feature of the present invention, and the details of the detection of the rotational speeds will be described later.

Moreover, a control section 440 controls the whole of the video deck and is composed of a central processing unit (CPU), a read only memory (ROM), a random access memory (RAM) and other components. Particularly in the present embodiment, the operation of the playing time limiting mode for limiting the usage time of the video deck under the control of the control section 440 is executed. Moreover, storage means for storing the playing time and the locking time of the playing time limiting mode is provided in the control section 440.

Moreover, the operation section 450 includes the aforesaid various operation keys formed on the front surface of the housing 100 and other operation keys such as a key for a remote control operation. An operation signal generated in the operation section 450 is transferred to the control section 440 in sequence to be processed therein.

Moreover, a timer section 460 is for performing various timing necessary for the video deck. Particularly in the present embodiment, the timer section 460 includes playing time timing means for timing the playing time and locking time timing means for timing the locking time, both of the playing time and the locking time being included in the playing time limiting mode for limiting the usage time of the video deck.

In the video deck having such a structure, video signals reproduced from a video tape are output to the TV monitor (not shown) through a cable, and the video signals are displayed on the screen of the TV monitor as video pictures.

Incidentally, as the usage form of the TV monitor, it is possible to use it as a monitor device only for the video deck by adopting, for example, a form without using an antenna or a form without connecting a cable in case of a cable TV.

In particular, in the case where the video deck is used in the playing time limiting mode for limiting the usage time thereof like the present embodiment, the video deck can take a more effective usage form by making TV programs also impossible to observe during the use limitation of the video deck.

Next, a concrete example of the operation of the playing time limiting mode that is a characteristic feature of the present embodiment will be described in detail by reference to a flow chart.

Figure 3:
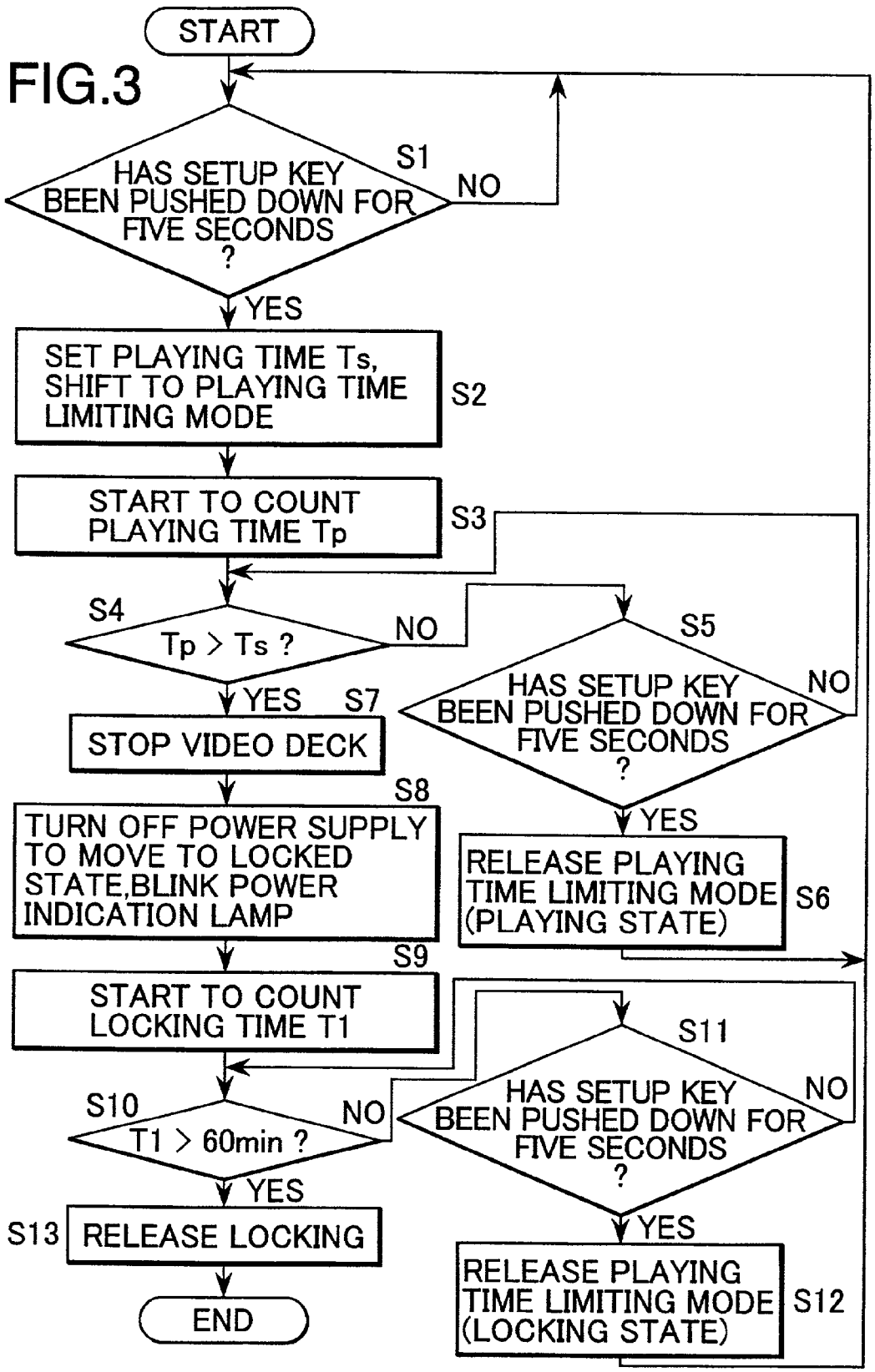
FIG. 3 is a flow chart showing a first example of the operation of the video deck shown in FIG. 1.

FIG. 3 is a flow chart showing a first example of the operation of the playing time limiting mode in the present embodiment.

In the first example of the operation, a user sets a playing time with the setup key 140, and then the operation shifts to the playing time limiting mode at a point of time when the user settles the setup of the playing time again with the setup key 140, and the operation enters into the counting of the playing time from that time, and further the operation enters into the counting of the locking time after the completion of the counting of the playing time, and then the operation turns off the power source of the video deck during the counting of the locking time for limiting the usage of the video deck.

In FIG. 3, first, at Step S1, the video deck is monitoring whether or not the user has pushed down the setup key 140 continuously for five seconds or more.

That is, because, if a simple pushing down operation of the setup key 140 makes it possible to enter the playing time limiting mode or to release the mode, the operation is simple enough for a child to operate the key 140, the present example judges whether the setup key 140 is properly operated or not under the condition that the key has been pushed down continuously for five seconds or more.

Then, when the continuous pushing down of the setup key 140 for five seconds or more is detected, a setup screen is displayed on the TV monitor and the playing time is set on the screen.

For example, the default value of the playing time Ts before the setting thereof is set to be off (zero minutes), and the choices thereof are set at thirty-minute intervals up to 180 minutes at the maximum. The selection is made with a key (for example, the rewind key 200 or the fast-forward key 210) other than, for example, the set up key 140, and the selection of the playing time Ts is settled by the pushing down of the setup key 140 for five seconds or more in a state that a desired time has been selected.

Thereby, the setup operation is completed and the setup screen is ended. At the same time, the operation shifts to the playing time limiting mode (Step S2).

Then, in the present example, the counting of the playing time counter is begun at the same time of the shifting to the playing time limiting mode (Step S3).

After that, a counted value Tp of the playing time counter and the playing time Ts are compared with each other (Step S4). When the counted value Tp does not exceed the playing time Ts, the continuous pushing down of the setup key 140 for five seconds or more is ascertained (Step S5). When the setup key 140 has continuously been pushed down for five seconds or more, the playing time limiting mode is released at that time (Step S6), and the operation returns to Step S1. Moreover, when the setup key 140 has not been pushed down continuously for five seconds or more, the operation returns to Step S4, and the comparison of the counted value Tp and the playing time Ts is continued.

Moreover, when the counted value Tp exceeds the playing time Ts, the operation of the video deck is stopped (Step S7), and the power source is turned off. And then, the operation enters into the locking state (Step S8). Here, as described above, the blinking operation of the power indication lamp 121 is performed to inform the user that the video deck is now in the locking operation of the playing time limiting mode.

Then, the counting of a locked time counter is begun (Step S9), and a counted value T1 of the locked time counter and a reference time, sixty minutes, are compared (Step S10). That is, in the present example, the locking time is beforehand determined to be sixty minutes.

Then, when the counted value T1 does not exceed the reference time, sixty minutes, the continuous pushing down of the setup key 140 for five seconds or more is ascertained (Step S11). When the setup key 140 has been pushed down continuously for five seconds or more, the playing time limiting mode is released at that time (Step S12), and the operation returns to Step S1. Moreover, when the setup key 140 has not been pushed down continuously for five seconds or more, the operation returns to Step S10, and the comparison of the counted value T1 and the reference time, sixty minutes, is continued.

Then, when the counted value T1 exceeds the reference time, sixty minutes, the locking state is released, and the video deck is returned to the usable state (Step S13). And then a series of the operation of the playing time limitation mode is ended.

Figure 4:
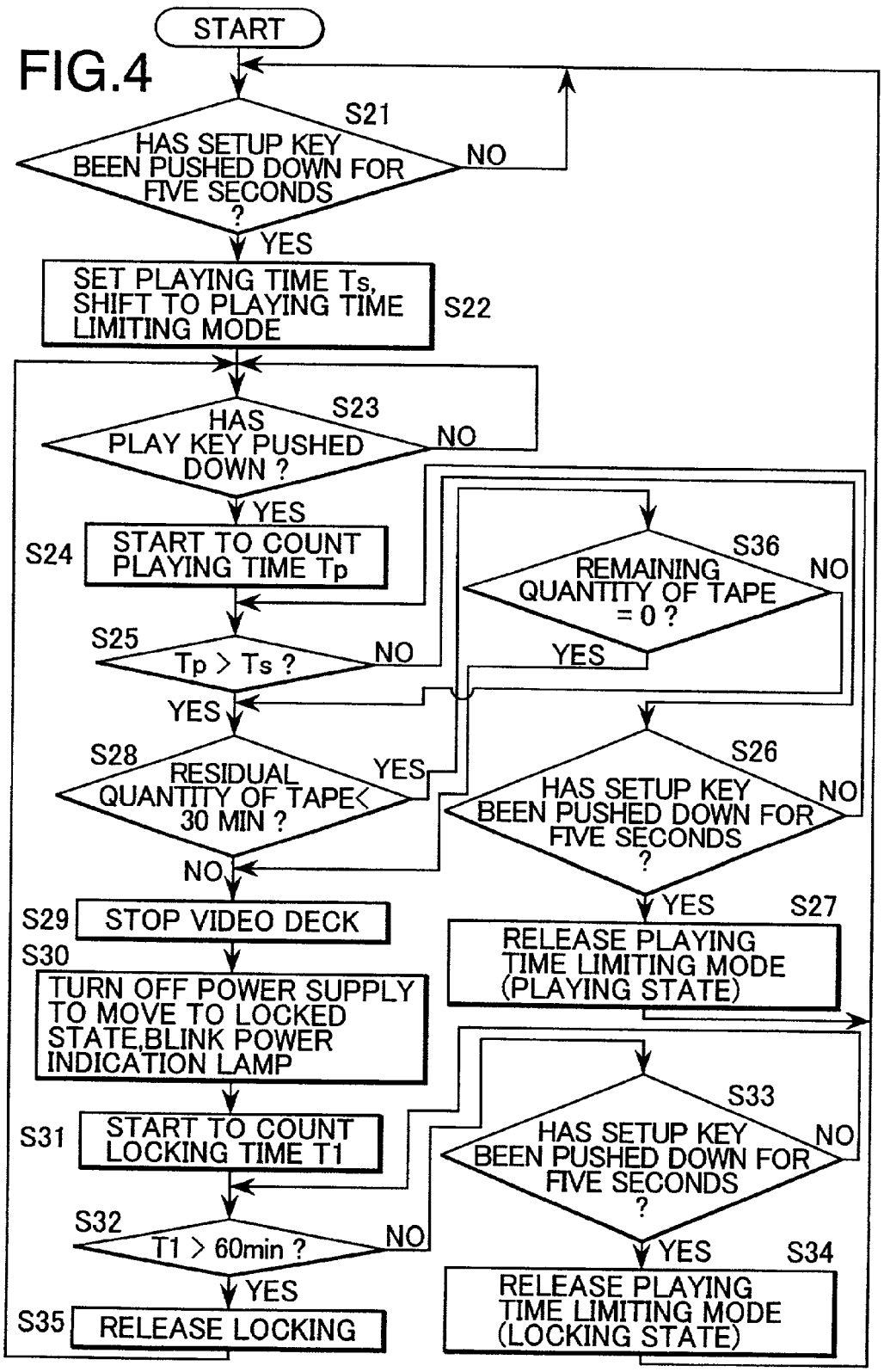
FIG. 4 is a flow chart showing a second example of the operation of the video deck shown in FIG. 1.

FIG. 4 is a flow chart showing a second example of the operation of the playing time limiting mode in the present embodiment.

In the present example of the operation, the counting operation of the playing time is begun after the start of the operation of playing by the pushing down of the play key 190 after the shifting to the playing time limiting mode.

Moreover, in the present example, the operation does not shift to the locking state immediately after the passage of the playing time, but the remaining playing time is calculated on the basis of the tape remaining quantity, and when the calculated remaining playing time is shorter than a prescribed reference time (for example, thirty minutes), the playing of the video deck is continued.

In FIG. 4, first, at Step S21, the video deck is watching whether or not a user pushed down the setup key 140 continuously for five seconds or more. The operation is the same as that of the first example of the operation.

Then, when the continuous pushing down of the setup key 140 for five seconds or more is detected, a setup screen is displayed on the TV monitor and the playing time is set on the screen. And then, the setup operation is completed by the next pushing down of the setup key 140 for five seconds or more. Thereby, the setup screen is ended, and the operation shifts to the playing time limiting mode (Step S22).

Then, in the present example, the pushing down of the play key 190 is monitored after the shifting to the playing time limiting mode. When the play key 190 is pushed down (Step S23), the counting of the playing time counter is begun (Step S24).

After that, a counted value Tp of the playing time counter and the playing time Ts are compared with each other (Step S25). When the counted value Tp does not exceed the playing time Ts, the continuous pushing down of the setup key 140 for five seconds or more is ascertained (Step S26). When the setup key 140 has continuously been pushed down for five seconds or more, the playing time limiting mode is released at that time (Step S27), and the operation returns to Step S21. Moreover, when the setup key 140 has not been pushed down continuously for five seconds or more, the operation returns to Step S25, and the comparison of the counted value Tp and the playing time Ts is continued.

Moreover, when the counted value Tp exceeds the playing time Ts, the tape remaining quantity at that time is calculated on the basis of the detected outputs of the aforesaid sensor sections 430A and 430B. Then, the calculated tape remaining quantity is regarded as the remaining playing time to be compared with a reference time, thirty minutes (Step S28).

Now, when the tape remaining quantity is larger than the reference time, thirty minutes, the operation of the video deck is stopped (Step S29), and the power source is turned off. And then, the operation enters into the locking state (Step S30). Here, as described above, the blinking operation of the power indication lamp 121 is performed to inform the user that the video deck is now in the locking operation of the playing time limiting mode.

Then, the counting of the locked time counter is begun (Step S31), and the counted value T1 and the reference time, sixty minutes, are compared (Step S32).

Then, when the counted value T1 does not exceed the reference time, sixty minutes, the continuous pushing down of the setup key 140 for five seconds or more is ascertained (Step S33). When the setup key 140 has been pushed down continuously for five seconds or more, the playing time limiting mode is released at that time (Step S34), and the operation returns to Step S21. Moreover, when the setup key 140 has not been pushed down continuously for five seconds or more, the operation returns to Step S32, and the comparison of the counted value T1 and the reference time, sixty minutes, is continued.

Then, when the counted value T1 exceeds the reference time, sixty minutes, the locking state is released, and the video deck is returned to the usable state (Step S35). And then the operation returns to Step S23. Thereby, the operation of the playing time limiting mode is again becomes possible under the same condition.

Moreover, at Step S28, when the tape remaining quantity is smaller than the reference time, thirty minutes, the video deck continues its playing operation as it is (Step S36), and then when the tape remaining quantity becomes zero, the operation advances to Step S29 to shift to the locking state.

As described above, in the present example, even if the beforehand set playing time has passed, when the remaining playing time at the time is short, the playing of the video deck is continued as it is, and thereby the video tape can be observed until the end thereof.

In the above, the present embodiment is described, but the present invention is not limited to the above examples and various modifications and applications are possible.

For example, the continuous pushing down of the setup key 140 for five seconds or more is set as a condition for the setting of the playing time and the selection and the release of the playing time limiting mode, but the present invention is not limited to the pushing down. The setting of the playing time and the selection and the release of the playing time limiting mode may be performed by the condition of, for example, the combination of an operation of the setup key 140 and an operation of another specific key at the same time.

Moreover, in each above-mentioned operation of the examples, the locking time is set as the prescribed sixty minutes, but the locking time may be an item settable by a user. For example, the setting operation of the playing time may be performed together with the setting of the locking time.

Moreover, the reference time that is a judgment basis for the extension of the playing time is set as thirty minutes in the aforesaid second example of the operation, but the reference time may also be settable by a user. For example, the setting operation of the playing time may be performed together with the setting of the reference time.

Moreover, in the aforesaid embodiment, the video deck that is separated from the TV monitor is described as an example of the picture image outputting apparatus of the present invention, but it may be structured as an integrated-type video cassette recorder with the TV monitor.

Moreover, in the above description, the outputting of a picture image is stopped by the turning off of the power supply on the video deck side after the passage of the playing time, but the control of stopping the operation of the TV monitor may be performed at the same time.

Moreover, the present invention is not limited to the application to the equipment using a video tape, but it may be applicable to various video apparatus using other picture image recording media.

For example, the present invention may be applied to a DVD player using a digital versatile disk including a digital video disc. Moreover, the invention may be applied to a digital TV, various game machines and other various apparatus for reproducing picture image information delivered through a network such as the Internet.

Incidentally, because in the apparatus those which treat various digital contents, it is presumable that the playing time of each information is beforehand given as the management information, when the remaining playing time is calculated in the aforesaid second example of the operation, the remaining time of the information being played may be calculated from the management information.

Although the invention has been described in its preferred form with a certain degree of particularity, obviously many changes and variations are possible therein. It is therefore to be understood that the present invention may be practiced than as specifically described herein without departing from scope and the sprit thereof.

What is claimed is:

1. A picture image outputting apparatus for outputting a picture image for display, said apparatus comprising:
   storage means for storing a playing time for enabling an output operation of a picture image and a locking time for disabling the output operation of a picture image;
   playing time timing means for timing the playing time;
   locking time timing means for timing the locking time;
   mode selecting means for selecting a playing time limiting mode for controlling the picture image outputting apparatus on a basis of the playing time and the locking time; and
   control means for starting timing of said playing time timing means after the playing time limiting mode has been selected and for starting timing of said locking time timing means when passage of the playing time is detected to disable the output operation of the picture image until the locking time has passed, said apparatus further comprising:

calculation means for calculating remaining playing time of information being played in progress when the passage of the playing time is detected; and comparison means for comparing the calculated remaining playing time with a reference time, wherein:

said control means immediately starts the timing of said locking time timing means and disables the output operation of the picture image until the locking time has passed when the remaining playing time is larger than the reference time, and starts the timing of said locking time timing means and disabls the output operation of the picture image until the locking time has passed after the remaining playing time has passed when the remaining playing time is smaller than the reference time.

2. The picture image outputting apparatus according to claim 1, further comprising:

playing time setting means for user's setting of the playing time.

3. The picture image outputting apparatus according to claim 2, wherein said playing time setting means is means for selecting a playing time from a plurality of playing time.

4. The picture image outputting apparatus according to claim 2, wherein said playing time setting means enters a playing time setting mode by a user's continuous operation of a specific key for a fixed time, and settles the set playing time by a user's second continuous operation of the specific key for the fixed time.

5. The picture image outputting apparatus according to claim 4, wherein said control means releases the playing time limiting mode when the specific key is continuously operated for the fixed time after the playing time limiting mode has been selected.

6. The picture image outputting apparatus according to claim 2, wherein said mode selecting means detects completion of the setting of the playing time with said playing time setting means to select the playing time limiting mode.

7. The picture image outputting apparatus according to claim 1, wherein said control means starts the timing of said playing time timing means immediately after the playing time limiting mode has been selected.

8. The picture image outputting apparatus according to claim 1, wherein said control means starts the timing of said playing time timing means after the playing time limiting mode has been selected and an operation of a play switch has been detected.

9. The picture image outputting apparatus according to claim 8, wherein said control means resumes the timing of said playing time timing means when said control means detects the operation of the play switch in a case where passage of the locking time is detected.

10. The picture image outputting apparatus according to claim 1, said apparatus further comprising indication means for indicating a locking state during the timing of said locking time timing means.

11. The picture image outputting apparatus according to claim 10, wherein said indication means is means for blinking a power indcation lamp.

12. The picture image outputting apparatus according to claim 1, wherein said picture image outputting apparatus is a picture image reproducer for reproducing picture image information stored in a prescribed storage medium to output the reproduced picture image information.

13. The picture image outputting apparatus according to claim 12, wherein said picture image reproducer is a video deck for reproducing a videocassette tape to output a reproduced picture image signal.

14. The picture image outputting apparatus according to claim 13, said apparatus further comprising:

calculation means for calculating remaining playing time of information beging playing in progress on a basis of a rotational speed of a tape reel of the video cassette tape when the passage of the playing time is detected; and comparison means for comparing the calculated remaining playing time with a reference time, wherein:

said control means immediately starts the timing of said locking time timing means and disables the output operation of the picture image until the locking time has passed when the remaining playing time is larger than the reference time, and starts the timing of the said locking time timing means and disables the output operation of the picture image until the locking time has passed after the remaining playing time has passed when the remaining playing time is smaller than the reference time.

15. The picture image outputting apparatus according to claim 12, wherein said picture image reproducer is a digital versatile disk apparatus for reproducing an optical disk to output a reproduced picture image and/or a reproduced sound to a monitor device.

16. The picture image outputting apparatus according to claim 12, wherein said picture image reproducer is a game machine for executing a game in a state of being connected with a monitor device.

17. The picture image outputting apparatus according to claim 1, wherein said apparatus is an apparatus for demodulating picture image information delivered through a network to output the demodulated picture image information.

18. A picture image outputting apparatus for outputting a picture image for display, said apparatus comprising:

storage means for storing a playing time for enabling an output operation of a picture image and a locking time for disabling the output operation of a picture image;

playing time timing means for timing the playing time;

locking time timing means for timing the locking time;

mode selecting means for selecting a playing time limiting mode for controlling the picture image outputting apparatus on a basis of the playing time and the locking time; and control means for starting timing of said playing time timing means after the playing time limiting mode has been selected and for starting timing of said locking time timing means when passage of the playing time is detected to disable the output operation of the picture image until the locking time has passed, wherein said picture image outputting apparatus is a picture image reproducer for reproducing picture image information stored in a prescribed storage medium to output the reproduced picture image information, wherein said picture image reproducer is a video deck for reproducing a videocassette tape to output a reproduced picture image signal, and said apparatus further comprising:

calculation means for calculating remaining playing time of information beging playing in progress on a basis of a rotational speed of a tape reel of the video cassette tape when the passage of the playing time is detected; and comparison means for comparing the calculated remaining playing time with a reference time, wherein:

said control means immediately starts the timing of said locking time timing means and disables the output operation of the picture image until the locking time has passed when the remaining playing time is larger than the reference time, and starts the timing of the said locking time timing means and disables the output operation of the picture image until the locking time has passed after the remaining playing time has passed when the remaining playing time is smaller than the reference time.

19. The picture image outputting apparatus according to claim 18, wherein said picture image reproducer is a digital versatile disk apparatus for reproducing an optical disk to output a reproduced picture image and/or a reproduced sound to a monitor device.

20. The picture image outputting apparatus according to claim 18, wherein said picture image reproducer is a game machine for executing a game in a state of being connected with a monitor device.

* * * * *

UNITED STATES PATENT AND TRADEMARK OFFICE
CERTIFICATE OF CORRECTION

PATENT NO. : 7,006,754 B2
APPLICATION NO. : 09/863445
DATED : February 28, 2006
INVENTOR(S) : Toshiaki Notsuyu et al.

It is certified that error appears in the above-identified patent and that said Letters Patent is hereby corrected as shown below:

Column 9:
Line 12, "disabls" should read -- disables --.

Column 10:
Line 3, "videocassette" should read -- video cassette --.
Line 8, "beging" should read -- being --.
Line 60, "videocassette" should read -- video cassette --.
Line 64, "beging" should read -- being --.

Signed and Sealed this

Seventeenth Day of October, 2006

JON W. DUDAS
*Director of the United States Patent and Trademark Office*